United States Patent
Hironaka

(10) Patent No.: US 6,739,571 B2
(45) Date of Patent: May 25, 2004

(54) SOLENOID VALVE

(75) Inventor: Hideharu Hironaka, Anjo (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 128 days.

(21) Appl. No.: 09/987,468

(22) Filed: Nov. 14, 2001

(65) Prior Publication Data

US 2002/0056823 A1 May 16, 2002

(30) Foreign Application Priority Data

Nov. 14, 2000 (JP) .................................... 2000-346450

(51) Int. Cl.[7] ............................................... F16K 31/02
(52) U.S. Cl. ................................... 251/50; 251/129.15
(58) Field of Search ............................. 251/129.15, 12, 251/50, 48

(56) References Cited

U.S. PATENT DOCUMENTS

| | | | | |
|---|---|---|---|---|
| 4,634,096 A | * | 1/1987 | Hara | 251/50 |
| 5,139,224 A | * | 8/1992 | Bright | 251/50 |
| 5,601,275 A | * | 2/1997 | Hironaka | 251/50 |
| 5,722,633 A | * | 3/1998 | Goossens et al. | 251/50 |
| 6,003,838 A | * | 12/1999 | Beck | 251/129.15 |
| 6,116,278 A | * | 9/2000 | Baumgardner et al. | 251/206 |

FOREIGN PATENT DOCUMENTS

| | | |
|---|---|---|
| JP | 8-93955 A | 4/1996 |
| JP | 9-502947 A | 3/1997 |

* cited by examiner

*Primary Examiner*—John Bastianelli
(74) *Attorney, Agent, or Firm*—Burns, Doane, Swecker & Mathis, LLP

(57) ABSTRACT

A solenoid valve includes a movable member disposed in a sleeve for moving in an axial direction, a valve mechanism portion opening and closing in accordance with axial movement of the movable member to establish and interrupt fluid communication, a valve chamber exposed to an end surface of the movable member at the valve mechanism portion side and the valve mechanism portion, and a damper chamber exposed to the other end surface of the movable member axially opposite to the end surface at the valve mechanism portion side. The movable member is provided with a throttling portion for establishing fluid communication between the damper chamber and the valve chamber to introduce operational fluid from the damper chamber to the valve chamber. The throttling portion is unitary formed on a sliding surface portion of the movable member.

20 Claims, 3 Drawing Sheets

SOLENOID VALVE

This application is based on and claims priority under 35 U.S.C. § 119 with respect to Japanese Application No. 2000-346450 filed on Nov. 14, 2000, the entire content of which is incorporated herein by reference.

FIELD OF THE INVENTION

The present invention generally relates to a solenoid valve. More particularly, the present invention pertains to a damper mechanism of a movable member included in a solenoid valve having a valve mechanism portion which opens and closes in accordance with the movement of the movable member in the axial direction for establishing and interrupting the fluid communication.

BACKGROUND OF THE INVENTION

Known solenoid valves have a valve mechanism which opens and closes in accordance with the movement of the movable member in the axial direction for establishing and interrupting fluid communication. These solenoid valves also include a damper mechanism for slowing the moving speed of the movable member in the axial direction for purposes of reducing the noise generated when the solenoid valve is opened and closed.

Japanese Patent Laid-Open Publication No. H08-93955 and Japanese Patent Laid-Open Publication No. H09-502947 disclose a solenoid valve which includes a movable member disposed in a sleeve in an axially slidable manner, a valve mechanism for establishing and interrupting the fluid communication through opening and closing of the valve in accordance with the movement of the movable member in the axial direction, a valve chamber exposed to an end surface of the movable member at a valve mechanism portion side and to the valve mechanism portion, and a damper chamber exposed to the opposite end surface of the moveable member. A ring groove is provided on the external surface of the movable member. The valve chamber and the damper chamber are sealed in a liquid-tight manner by the cooperation of a seal ring provided in the ring groove and an internal surface of the sleeve. The communication between the valve chamber and the damper chamber is established through a communication bore provided in the movable member. The operational fluid in the damper chamber is introduced into the valve chamber via the communication bore. With the solenoid valve constructed in the manner described above, because the operational fluid in the damper chamber is introduced into or discharged from the valve chamber via the communication bore in accordance with the movement of the movable member when the movable member is actuated, the moving speed of the movable member in the axial direction is slowed by a differential pressure generated when the operational fluid passes through the communication bore. As explained above, the damper mechanism of the movable member is structured with the seal ring and the communication bore in the known solenoid valve.

However, with this construction of the known solenoid valves, the seal ring is required for providing the damper mechanism of the movable member. Further, in order to receive the seal ring, the ring groove has to be machined on the external surface of the movable member. This increases the overall cost for the solenoid valve in terms of the number of parts and the manufacturing cost.

A need thus exists for a solenoid valve which has a movable member with damper effects, but which is not as susceptible to the drawbacks mentioned above.

SUMMARY OF THE INVENTION

In accordance with one aspect of the invention, a solenoid valve includes a sleeve, a movable member disposed in the sleeve to move in an axial direction, a valve mechanism portion that is openable and closable in accordance with axial movement of the movable member for establishing and interrupting operational fluid communication across the valve mechanism portion, a valve chamber exposed to the valve mechanism portion and an end surface of the movable member at a valve mechanism portion side of the movable member, and a damper chamber exposed to an axially opposite end surface of the movable member located opposite the end surface at the valve mechanism portion side. A throttling portion is unitarily formed on a sliding surface of the movable member to establish fluid communication between the damper chamber and the valve chamber and introduce operational fluid from the damper chamber to the valve chamber.

According to another aspect of the invention, a solenoid valve for controlling fluid flow between an inlet and an outlet includes a sleeve, an axially movable member disposed in the sleeve and having a first end surface at one axial end of the axially movable member and a second end surface at an axially opposite end of the axially movable member, a solenoid coil positioned adjacent the sleeve and adapted to be energized to axially move the axially movable member, a valve mechanism portion openable and closable in response to axial movement of the axially movable member for respectively permitting and preventing fluid communication between the inlet and the outlet, a valve chamber exposed to the valve mechanism portion and to the first end surface of the axially movable member, and a damper chamber exposed to the second end surface of the axially movable member. At least one recess is formed in the axially movable member and constitutes a throttling portion establishing fluid communication between the damper chamber and the valve chamber.

BRIEF DESCRIPTION OF THE DRAWING FIGURES

The foregoing and additional features and characteristics of the present invention will become more apparent from the following detailed description considered with reference to the accompanying drawing figures in which like reference numerals designate like elements.

DETAILED DESCRIPTION OF THE INVENTION

Figure 1:
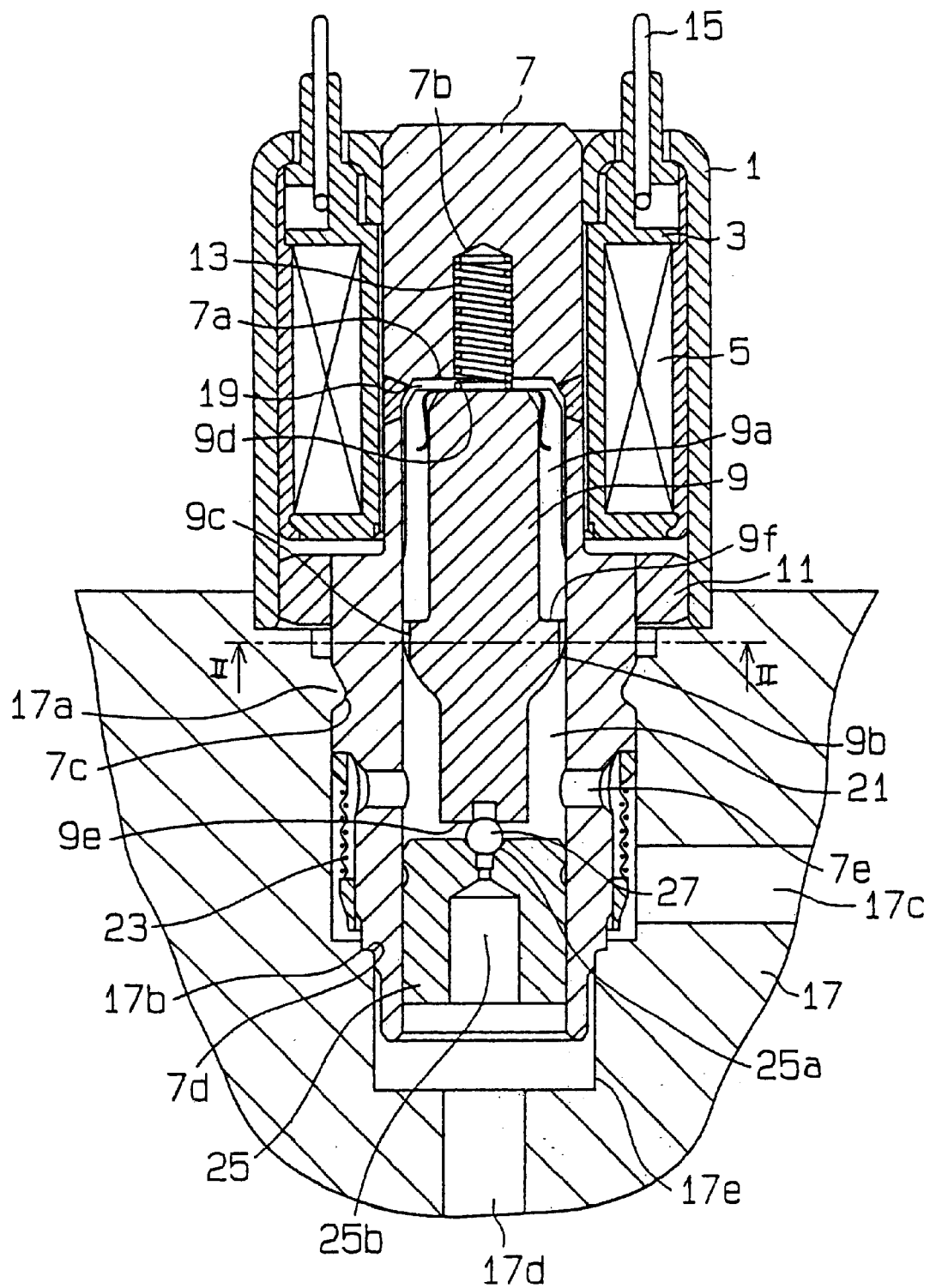
FIG. 1 is a cross-sectional view of a normally closed type solenoid valve according to a first embodiment of the present invention.

FIG. 1 illustrates in cross-section a normally closed type solenoid valve according to a first embodiment of the present invention. The solenoid valve includes a housing 17 and a sleeve 7 made of magnetic material having a cylindrical shape. The bottom portion of the sleeve 7 is inserted into or positioned in a stepped cylindrical bore 17e of the housing 17 from the open end of the housing 17. The sleeve 7 and the housing 17 are sealed in a liquid-tight manner at several places such as a first rivet or engaging portion 7c, 17a, and a second rivet or engaging portion 7d, 17b. The housing 17 is provided with an inlet bore 17c and an outlet bore 17d. The inlet bore 17c is in communication with a valve chamber 21 in the sleeve 7 via a filter 23 fixed to the sleeve 17 and a lateral hole 7e in the bottom portion of the sleeve 17. The first rivet or engaging portion 7c, 17a interrupts or prevents communication between the inlet bore 17c and the atmosphere. The second rivet or engaging portion 7d, 17b interrupts or prevents communication between the inlet bore 17c and the outlet bore 17d.

A movable member 9 made of magnetic material is inserted into or positioned in a blind bore of the sleeve 7 in an axially slidable manner. The slidable movement of the movable member 9 in the sleeve 7 is defined as follows. Although the external surface of the movable member 9 and the internal surface of the sleeve 7 which are opposite to each other and positioned in facing relation are configured to provide a predetermined clearance, the movable member 9 is inserted into or positioned in the sleeve 7 with the predetermined clearance that is dimensioned to be sufficiently narrow to have a substantial sealing function relative to the operational speed of the movable member 9.

A valve seat member 25 is press-fitted into an opening end portion of the sleeve 7. The valve seat member 25 includes a valve seat 25a that is in communication with the outlet bore 17d of the housing 17 via a stepped cylindrical bore 25b provided coaxially with respect to the valve seat member 25. A ball 27 is provided between the end surface 9e (valve mechanism portion side end surface) of the movable member 9 and the valve seat 25a. The sleeve 7 is also provided with a cylindrical bore 7b positioned coaxially with respect to the blind bore in the sleeve 7 that receives the movable member 9 and opens to the bottom surface 7a of the bore in the sleeve 7 that receives the movable member 9.

A spring 13 is also positioned in the cylindrical bore 7b. The spring 13 biases the movable member 9 towards the valve seat member 25 side (i.e., in the downward direction of FIG. 1). The valve mechanism portion side end surface 9e of the movable member 9 pushes the ball 27 downwardly in FIG. 1 by the biasing force of the spring 13. Thus, the ball 27 contacts the valve seat 25a during the normal condition. The valve seat 25a, the ball 27, and the valve mechanism portion side surface 9e of the movable member 9 constitute or form a valve mechanism portion.

A ring 11 of magnetic material is provided on the external periphery of the sleeve 7 towards the bottom surface side of the sleeve 7 and projects from the housing 17. A cylindrical yoke 1 made of magnetic material covers the ring 11 and the sleeve 7.

A bobbin 3 made of non-magnetic material for supporting a solenoid coil 5 is fixedly provided in the yoke 1. A pair of terminals 15 project from the bobbin 3. Each terminal 15 is connected to the solenoid coil 5 and to a controller (not shown) which controls an external power source or solenoid valves for exciting the solenoid coil 5. The solenoid coil 5 is wound around the bobbin 3. The solenoid coil 5, the yoke 1, the ring 11, the sleeve 7, and the movable member 9 form a magnetic circuit. In the normal condition of the solenoid valve, a predetermined clearance exists between the bottom surface 7a of the bore in the sleeve 7 and the end surface 9d (upper side end surface of FIG. 1) of the movable member 9 that is located at the axially opposite end of the movable member 9 from the valve mechanism portion side end surface 9e of the movable member 9. This predetermined clearance corresponds to an operational stroke range of the movable member 9 and functions as a magnetic gap.

Figure 2:
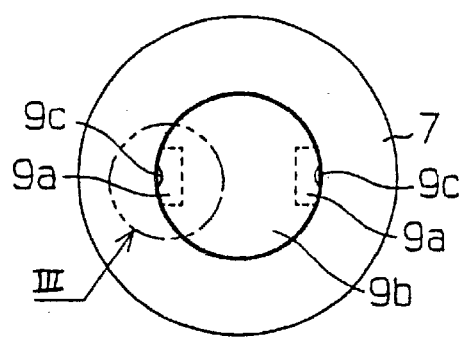
FIG. 2 is a cross-sectional view of the solenoid valve taken along the section line II—II in FIG. 1.
Figure 3:
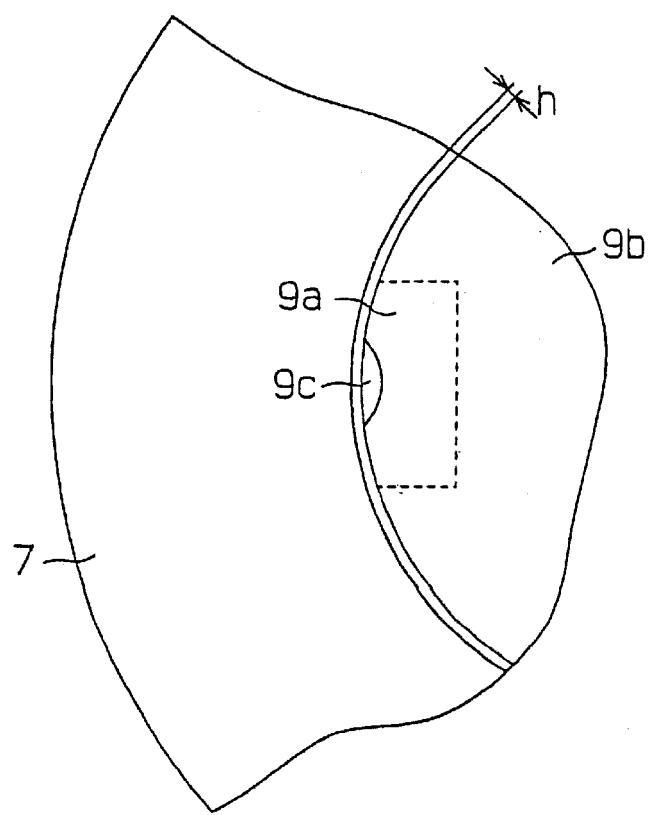
FIG. 3 is an enlarged view of the portion of the solenoid valve identified as III in FIG. 2.

Further details associated with the movable member 9 can be seen with reference to FIGS. 2 and 3 as well as FIG. 1. As shown in FIGS. 1 and 2, the radius (or width-wise dimension) of the valve mechanism portion side end surface 9e of the movable member 9 is smaller than the radius (or width-wise dimension) of the end surface 9d. A pair of spaces or recessed portions 9a, each having a U-shaped cross-section, is formed between the movable member 9 and the inner surface of the sleeve 7. The spaces or recessed portions 9a are located opposite to each other in peripheral direction. That is, the spaces or recessed portions 9a are located diametrically opposite to one another. The axial length of the spaces or recessed portions 9a is a predetermined length corresponding to the distance or length from the end surface 9d of the movable member 9 to an axial end position 9f. The movable member 9 includes a sliding surface portion 9b formed to have a length from the axial end position 9f of the concave spaces 9a to a predetermined point in the valve mechanism portion side as depicted in FIG. 1.

As shown in FIG. 3, a predetermined clearance "h" is provided between the outer diameter of the sliding surface of the sliding surface portion 9b and the inner diameter of the sleeve 7. The clearance "h" is determined to be a relatively narrow value (e.g., on the order of about 30 microns) so that the sealing function is still achieved, taking into account the operational speed of the movable member 9 relative to the sleeve 7. Thus, the spaces or recessed portions 9a and the valve chamber 21 are substantially sealed by the sliding surface portion 9b of the movable member 9.

A damper chamber 19 exposed to the end surface 9d of the movable member 9 is defined by the space enclosed by the internal surface of the sleeve 7, the spaces or recessed portions 9a, and the sliding surface 9b of the movable member 9. The valve chamber 21 is exposed to the valve mechanism portion side end surface 9e of the movable member 9 and the valve mechanism portion, and is defined by the space enclosed by the internal surface of the sleeve 7, the valve seat member 25, the ball 27, and the sliding surface portion 9b of the movable member 9.

As shown in FIGS. 2 and 3, the sliding surface portion 9b of the movable member 9 is provided with throttling portions 9c. These throttling portions 9c are integrally formed in a unitary manner as part of the movable member 9 and are defined by recesses that are arc-shaped in cross-section in the radial direction at positions corresponding to the recessed portions or spaces 9a in the peripheral direction. The throttling portions 9c are parallel and extend in the axial direction, and have a predetermined length corresponding to the length of the sliding surface 9b of the movable member 9. The recessed portions or spaces 9a and the valve chamber 21 are thus in communication substantially only via the two throttling portions 9c. Accordingly, the operational fluid in the damper chamber 19 is movable to the valve chamber 21 only through the two throttling portions 9c. In the illustrated embodiment, the recessed portions or spaced 9a possess a greater depth (i.e., extend farther inwardly) than the throttling portions 9c as shown in FIGS. 1–3.

It is preferable that the throttling portions 9c have a length in the axial direction that is relatively short so that the damper effects is maintained. When the throttling portions 9c are excessively long, the throttling portions 9c tend not to function as an orifice, but rather perform a choke function. In such a case, the operational fluid may be vulnerable to the influence of viscosity changes associated with temperature changes of the operational fluid when passing through the throttling portions 9c. Thus, the damper effects cannot be uniformly achieved due to the temperature change of the operational fluid. In contrast, when the length of the throttled portions 9c is relatively shorter, the operational fluid becomes less subject to the viscosity change based on the temperature change of the operational fluid when passing through the throttling portions 9c. Thus, stable damper effects which are less subject to the influence of temperature changes of the operational fluid can be obtained.

The movable member 9 can be manufactured, for example, by drawing a bar to form the spaces or recessed portions 9a, and forming the sliding surface portion 9b and the throttling portions 9c by forging. Accordingly, it is not necessary to employ further processes for manufacturing the movable member 9. In addition, additional members for sealing the damper chamber and the valve chamber, such as seal rings, are not required. Thus, the movable member 9 and overall solenoid valve can be manufactured with less cost.

The operation of the solenoid valve according to the first embodiment of the present invention is as follows. When the solenoid coil 5 is not energized or excited (i.e., the normal condition), the movable member 9 is biased in the downward direction of FIG. 1 by the biasing force of the spring 13 to push the ball 27 downward. The ball 27 thus contacts the valve seat 25a, and the valve mechanism portion interrupts fluid communication between the inlet bore 17c and the outlet bore 17d. When the solenoid coil 5 is energized or excited by the controller, the attractive force of the magnet is generated at the magnetic gap formed between the end surface 9d of the movable member 9 and the bottom surface 7a of the bore in the sleeve 7 to thereby move the movable member 9 in the upper direction of FIG. 1 against the biasing force of the spring 13. Accordingly, the ball 27 and the valve seat 25a are separated from one another to establish fluid communication between the inlet bore 17c and the outlet bore 17d. By energizing (exciting) and stopping energization (excitement) of the solenoid coil 5, the valve mechanism portion can control the establishment and interruption of the fluid communication between the inlet bore 17c and the outlet bore 17d.

When the movable member 9 is moved, fluid communication between the damper chamber 19 and the valve chamber 21 is established substantially only via the throttling portions 9c. Thus, the moving speed of the movable member 9 in the axial direction can be slowed by the differential pressure generated when the operational fluid passes through the throttled portions 9c to generate the damper effects. Accordingly, by changing the opening dimension of the throttling portions 9c, the damper effects of the movable member 9 can be appropriately changed or controlled.

Figure 4:
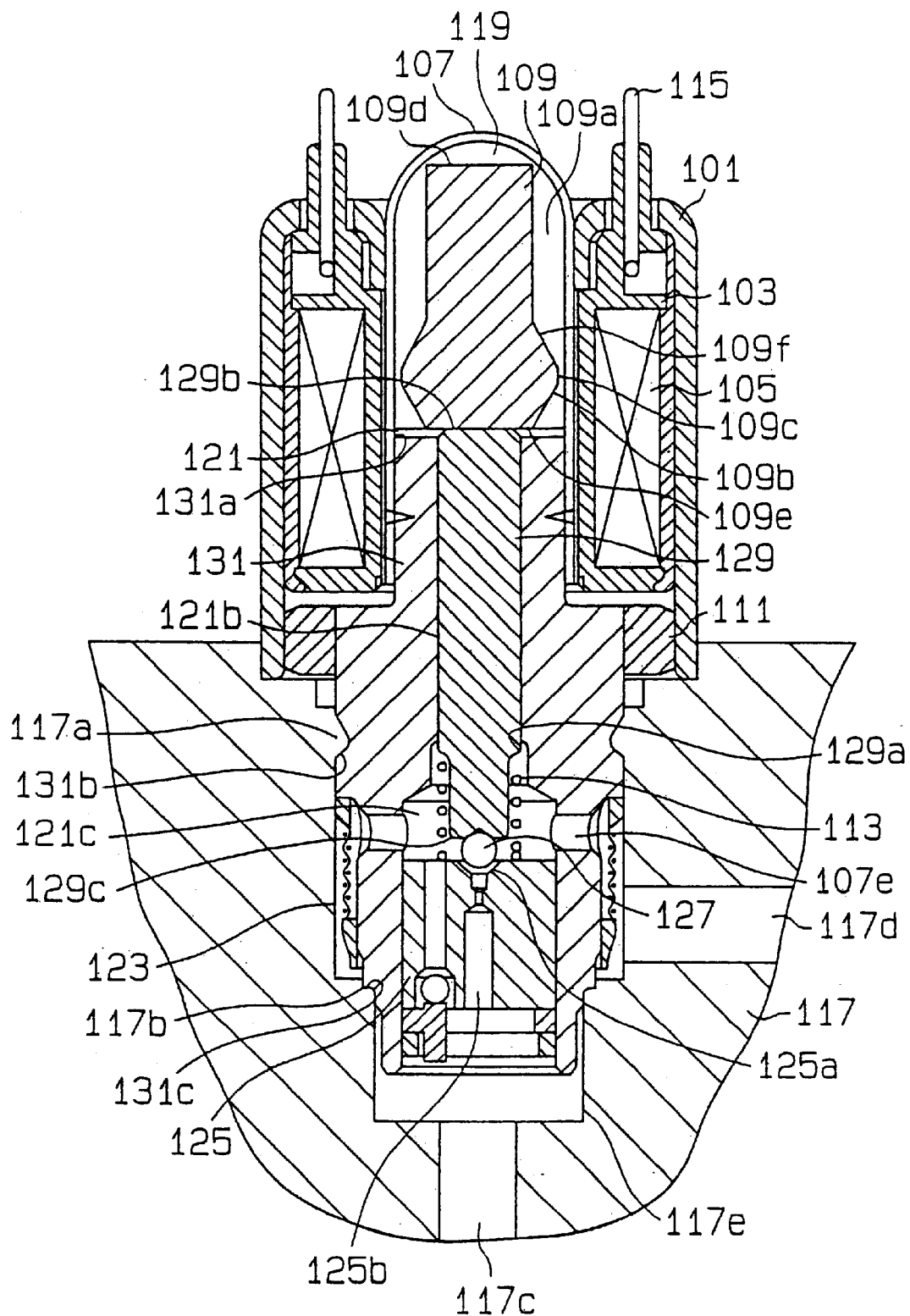
FIG. 4 is a cross-sectional view of a normally open type solenoid valve according to a second embodiment of the present invention.

A solenoid valve according to a second embodiment of the present invention is illustrated in FIG. 4. A detailed explanation of the elements and the features associated with the second embodiment that are the same as or equivalent to elements and features in the first embodiment shown in FIGS. 1–3 is not repeated. The following discussion describes differences between the solenoid valve according to the second embodiment relative to the first embodiment.

In the solenoid valve according to the second embodiment, a sleeve includes a first sleeve portion 107 and a second sleeve portion 131. A shaft 129 is provided between a movable element 109 and the ball 127. The shaft or rod 129 constitutes a first movable portion and the movable element 109 constitutes a second movable portion, with the first and second movable portions together forming a movable member. The valve employed in the second embodiment is a normally open type solenoid valve rather than the normally closed type solenoid valve shown in FIG. 1.

The shaft 129 is engaged by a spring 113 at a stepped portion 129a. The shaft 129 is normally biased upwardly in FIG. 4 by the biasing force of the spring 113. A valve mechanism portion side end surface 109e of the movable element 109 contacts the upper side end surface 129b of the shaft 129. Thus, the movable element 109 is biased upwardly in FIG. 4. In this condition, a magnetic gap is formed between the valve mechanism portion side end surface 109e of the movable element 109 and the upper side end surface 131a of the second sleeve 131.

The ball 127 is provided between the bottom side end surface 129c (i.e., the valve mechanism portion side end surface of the movable member) of the shaft 129 and a valve seat 125a. Because the movable element 109 is biased upwardly in FIG. 4 via the shaft 129 by the biasing force of the spring 113, the ball 127 and the valve seat 125a are separated to establish fluid communication between the inlet bore 117c and the outlet bore 117d. When the solenoid coil 105 is excited or energized, an attractive force resulting from the magnetic force is generated in the magnetic gap. By virtue of this, the movable element 109 is attracted and moved downwardly in FIG. 4, and so the ball 127 is pushed downwardly via the shaft 129 to contact the valve seat 125a to thereby interrupt the fluid communication between the inlet bore 117c and the outlet bore 117d.

The valve chamber 121 exposed to the valve mechanism portion side end surface 109e of the movable element 109 is in fluid communication with a space 121c exposed to the valve mechanism portion and the bottom side end surface 129c of the shaft 129 (i.e., the valve mechanism portion side end surface of the movable member) in FIG. 4 via a donut or annular shaped space 121b. This space is formed as a clearance between the internal surface of the second sleeve 131 and the external surface of the shaft 129. Thus, one valve chamber is formed by the valve chamber 121, the space 121b, and the space 121c.

The structure of the movable member 109, the sliding surface portion 109b, the throttling portions 109c, and the damper chamber 119 of the normally open type solenoid valve of the second embodiment are the same as the corresponding parts of the normally closed type solenoid valve according to the first embodiment. Thus, a detailed explanation of such features is not repeated here.

As described above, the normally closed type solenoid valve of the first embodiment and the normally open type solenoid valve of the second embodiment are advantageous in that the damper mechanism of the movable member can be relatively easily manufactured with less cost, thus providing advantages with respect to other known solenoid valves.

The principles, preferred embodiments and modes of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A solenoid valve comprising:

a sleeve;

a movable member disposed in the sleeve to move in an axial direction;

a valve mechanism portion that is openable and closable in accordance with axial movement of the movable member for establishing and interrupting operational fluid communication across the valve mechanism portion;

a valve chamber exposed to the valve mechanism portion and an end surface of the movable member at a valve mechanism portion side of the movable member;

a damper chamber exposed to an axially opposite end surface of the movable member located opposite the end surface at the valve mechanism portion side;

a throttling portion unitarily formed on a sliding surface of the movable member to establish fluid communication between the damper chamber and the valve chamber and introduce the operational fluid from the damper chamber to the valve chamber; and wherein the operational fluid in the damper chamber flows into the valve chamber via the throttling portion only by way of an outer periphery of the movable member.

2. The solenoid valve according to claim 1, wherein the throttling portion has a predetermined length in an axial direction and is formed by an arc-shaped recess in the sliding portion that extends inwardly in a cross-section at a right angle to the axial direction.

3. The solenoid valve according to claim 1, wherein the throttling portion is formed by plastic forming.

4. The solenoid valve according to claim 1, wherein the sleeve comprises a first sleeve portion and a second sleeve portion, and the movable member is comprised of a first movable portion and a second movable portion.

5. The solenoid valve according to claim 1, wherein the solenoid valve is a normally open solenoid valve.

6. The solenoid valve according to claim 5, including a solenoid coil adapted to be energized to cause axial movement of the movable member.

7. The solenoid valve according to claim 1, wherein the solenoid valve is a normally closed solenoid valve.

8. The solenoid valve according to claim 7, including a solenoid coil adapted to be energized to cause axial movement of the movable member.

9. A solenoid valve for controlling fluid flow between an inlet and an outlet comprising:

a sleeve;

an axially movable member disposed in the sleeve, the axially movable member having a first end surface at one axial end of the axially movable member and a second end surface at an axially opposite end of the axially movable member;

a solenoid coil positioned adjacent the sleeve and adapted to be energized to axially move the axially movable member;

a valve mechanism portion openable and closable in response to axial movement of the axially movable member for respectively permitting and preventing fluid communication between the inlet and the outlet;

a valve chamber exposed to the valve mechanism portion and to the first end surface of the axially movable member;

a damper chamber exposed to the second end surface of the axially movable member;

at least one recess unitarily formed on a sliding surface of the axially movable member constituting a throttling portion establishing fluid communication between the damper chamber and the valve chamber; and wherein fluid communication from the damper chamber to the valve chamber via the throttling portion is only by way of an outer periphery of the movable member.

10. The solenoid valve according to claim 9, wherein the at least one recess constituting the throttling portion is an arc-shaped recess formed in a sliding surface portion of the axially movable member.

11. The solenoid valve according to claim 9, wherein the sleeve comprises a first sleeve portion and a second sleeve portion.

12. The solenoid valve according to claim 9, wherein the axially movable member is comprised of a first axially movable portion and a second axially movable portion.

13. The solenoid valve according to claim 9, wherein the solenoid valve is a normally open solenoid valve.

14. The solenoid valve according to claim 9, wherein the solenoid valve is a normally closed solenoid valve.

15. The solenoid valve according to claim 9, wherein the at least one recess includes a pair of recesses formed in the axially movable member, each recess constituting a throttling portion establishing fluid communication between the damper chamber and the valve chamber.

16. The solenoid valve according to claim 9, wherein the axially movable member includes at least one recessed portion positioned adjacent the at least one recess constituting the throttling portion, the at least one recessed portion having a greater depth than the at least one recess constituting the throttling portion.

17. A solenoid valve for controlling fluid flow between an inlet and an outlet comprising:

a sleeve;

an axially movable member disposed in the sleeve, the axially movable member having a first end surface at one axial end of the axially movable member and a second end surface at an axially opposite end of the axially movable member, the axially movable member possessing a sliding surface;

a solenoid coil positioned adjacent the sleeve and adapted to be energized to axially move the axially movable member;

a valve mechanism portion openable and closable in response to axial movement of the axially movable member for respectively permitting and preventing fluid communication between the inlet and the outlet;

a valve chamber exposed to the valve mechanism portion and to the first end surface of the axially movable member;

a damper chamber exposed to the second end surface of the axially movable member;

at least one axially extending throttling portion unitarily formed on the sliding surface of the axially movable member, the throttling portion having one end opening into the damper chamber and an opposite end opening into the valve chamber to establish fluid communication between the damper chamber and the valve chamber; and wherein fluid communication from the damper chamber to the valve chamber via the throttling portion is only by way of an outer periphery of the movable member.

18. The solenoid valve according to claim 17, wherein the solenoid valve is a normally open solenoid valve.

19. The solenoid valve according to claim 17, wherein the solenoid valve is a normally closed solenoid valve.

20. The solenoid valve according to claim 17, wherein the throttling portion includes a recess provided on the sliding surface of the axially movable member, the axially movable member including at least one recessed portion positioned adjacent the recess forming the throttling portion, the at least one recessed portion having a greater depth than the recess forming the throttling portion.

* * * * *